(12) United States Patent
Seok

(10) Patent No.: US 6,993,550 B2
(45) Date of Patent: Jan. 31, 2006

(54) FIXED POINT MULTIPLYING APPARATUS AND METHOD USING ENCODED MULTIPLICAND

(75) Inventor: Jin Wuk Seok, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 650 days.

(21) Appl. No.: 10/121,726

(22) Filed: Apr. 15, 2002

(65) Prior Publication Data

US 2003/0120693 A1   Jun. 26, 2003

(30) Foreign Application Priority Data

Dec. 21, 2001  (KR) .............................. 2001-82413

(51) Int. Cl.
   *G06F 7/52*  (2006.01)
   *G06F 7/00*  (2006.01)
(52) U.S. Cl. ...................................... 708/620; 708/603
(58) Field of Classification Search ................ 708/620, 708/625, 603, 627–628
   See application file for complete search history.

(56) References Cited

U.S. PATENT DOCUMENTS

| 4,594,679 A | 6/1986 | George et al. |
| 6,573,940 B1 * | 6/2003 | Yang ........................... 348/441 |
| 6,584,483 B1 * | 6/2003 | Altus et al. ................. 708/620 |
| 2003/0131037 A1 * | 7/2003 | Freidhof ..................... 708/517 |

* cited by examiner

*Primary Examiner*—Tan V. Mai

(74) *Attorney, Agent, or Firm*—Mayer, Brown, Rowe & Maw LLP

(57) ABSTRACT

The invention relates to a fixed point multiplying apparatus and method using an encoded multiplicand. The multiplicand is encoded into an independent binary system instead of a conventional binary system and each bit value of the encoded multiplicand is used as a control signal about an inputted multiplier in order to effectively execute a fixed point multiplication used in a transform algorithm such as the DCT (Discrete Cosine Transformation) in use for a multimedia codec. The multiplication is executed at a high speed with a simple structure and a small gate number.

5 Claims, 1 Drawing Sheet

FIXED POINT MULTIPLYING APPARATUS AND METHOD USING ENCODED MULTIPLICAND

BACKGROUND OF THE INVENTION

1. Field of the Invention

The present invention relates to an apparatus and method for effectively performing a fixed point multiplication used in a transform algorithm such as a DCT (Discrete Cosine Transformal) in use for a multimedia codec. In particular, the invention is directed to a fixed point multiplying apparatus and method, which encodes a multiplicand into an independent binary system rather than a conventional binary system to use the encoded multiplicand in the transform algorithm, by which the multiplication is executed at a high speed with a simple structure and a small gate number.

2. Description of the Related Art

The Discrete Cosine Transform (DCT) is growing into a major element of the H.261, JPEG and MPEG as international multimedia standards at present due to the excellent performance of image compression.

Lossless compression completely restores a text, diagram, general data and the like, however, it has a mean compressibility of about 2 to 1. On the contrary, a compressibility of 10 to 1 or more can be easily obtained if the data such as an image, audio, sound and the like are so compressed to allow a small loss that cannot be detected by bare eyes or ears.

A multimedia image has a high repetitiveness among frames and pixels in one frame, and thus readily obtains a compressibility of 30 to 1 or more by utilizing visual characteristics as can be seen in an MPEG image compression. In a still image constituted of a single frame, only pixels in one frame are repeated while no repetition exists among frames. Therefore, the still image has a compressibility substantially lower than the MPEG as can be seen in the JPEG. The image such as a three-dimensional (multimedia) image or two-dimensional (still) image shows a high compressibility due to a high repetitiveness. On the contrary, an audio or sound is a one-dimensional data having repetitiveness lower than that of the image, and thus has a much lower compressibility. The Vector Sum Excited Linear Prediction (VSELP) as an audio compression scheme for a mobile communication in the North America obtains a compressibility of about 8 to 1. In the Dolby AC-3 or MPEG audio compression, the compressibility is about 6 to 1 in a single channel and 10 to 1 in a stereo or multi-channel (i.e. a 5.1 channel in watching a theatrical film) having a high repetitiveness among channels. In loss coding schemes, a transform coding is most widely used for effectively compressing the image data. A basic concept of this coding divides data, which are spatially arranged with a high correlation, into several frequency components ranging from a lower frequency component to a higher frequency component due to orthogonal transformation. Each of the frequency components is separately quantized.

The correlation substantially disappears among the frequency components, and the energy of a signal is concentrated to the lower frequency. Gain of the transform coding, which is obtained in the same bit rate as the simple Pulse Code Modulation (PCM), is the same as a ratio between the arithmetic mean and the geometric mean of the distribution of the frequency components. The compressibility increases as the energy is further concentrated toward the lower frequency.

The simple PCM about spatial data expresses all samples into bits of the same length, e.g. m-bit/sample, in which a signal-to-quantization noise ratio is about 6 m. On the contrary, in the data converted into a frequency range through the orthogonal transformation, more bits are allocated to such a frequency component which accumulates more energy (i.e., has a large value of distribution) so as to more completely express the frequency component. Every one bit is further allocated whenever the distribution is quadrupled (i.e. the amplitude is doubled) so that all of the frequency components have the same quantization error characteristics.

In various orthogonal transforms, the Karhunen-Loeve Transform (KLT) shows the most excellent compression effect due to the most theoretically excellent energy concentration characteristics. However, KLT cannot be used in practice because a conversion function is necessarily defined again for each image. In the DCT which is growing into the major technique in several international standards at present, 8×8 sized pixels are bound into one block as a unit of transformation. Enlarging the block increases the compressibility while barely realizing the transformation. The 8×8 block is experimentally selected as the compromise between performance and easiness of realization.

Quantization of the DCT may include Scalar Quantization (SQ) and Vector Quantization (VQ). The VQ is effective when the correlation among coefficients is high, but has a complexity higher than the SQ. Since the DCT coefficients have substantially no correlation, the SQ is adopted as the international standard at present. Further, the SQ also is divided into a linear scheme which is readily realized and a non-linear scheme which has excellent characteristics. The performance difference between the two schemes is narrowed when the quantized coefficients undergo entropy encoding (lossless) again. The H.261, JPEG and MPEG-1 use the linear scheme only because the entropy encoding is accompanied in the present international standard. However, the MPEG-2 adopts the non-linear scheme also for performance improvement.

Further, for the purpose of carrying out a lossless compression using statistical characteristics of the quantized DCT coefficients, the international standard combines the Run-length Encoding with the Huffman Encoding. The image compression is carried out via combination of various techniques such as the DCT, quantization, Run-length Encoding, Huffman Encoding and movement compensating DPCM (corresponding to the multimedia image only).

The transform algorithm such as the DCT used in the multimedia codec uses the multiplication with fixed points at least once. However, the real time image compression, for example, generally uses a fixed point operation in executing such a multiplication with a hardware because of constraining conditions including velocity and number of gate in use. In such a fixed point operation, however, a 2n bit operation result occurs in an n bit operation so that the delay time of a parallel adder causes a disadvantage to a high-speed operation.

SUMMARY OF THE INVENTION

Accordingly the present invention has been devised to solve the foregoing problems of the prior art, and it is an object of the invention to provide an apparatus and method for multiplying fixed points, which generates a noble operation rule by adopting a concept of encoded multiplicand instead of a conventional concept of fixed point operation and thus uses an enclosed multiplicand obtained therefrom.

In accordance with an aspect of the invention to accomplish the foregoing object, a fixed point multiplying apparatus for performing a multiplication of a multiplier and a multiplicand by encoding the multiplicand comprises: n number of n bit shift registers for storing binary data of the multiplier by shifting each of the binary data by one bit; adders for selecting and receiving one data as an input from a group consisting of the data stored in the shift registers, inverted data of the stored data, and 0 in response to a control signal for selecting the input; control blocks for storing multiplicand data which are binary encoded according to equation 1, selecting the shift registers corresponding to bit values of the multiplicand data, and applying the control signal to the corresponding adders; and n−1 number of multiplexers for sequentially adding output values from the adders according to each bit to output multiplication data of the multiplier and the multiplicand.

In accordance with another aspect of the invention to obtain the foregoing object, a fixed point multiplying method for performing a multiplication of a multiplier and a multiplicand by encoding the multiplicand comprises the following steps of: storing binary data of the multiplier into n number of n bit shift registers by shifting each of the binary data by one bit; storing binary encoded multiplicand data; selecting one data from a group including the data stored in the shift registers, inverted data of the stored data and 0 in response to each of the bit-shifted data of the encoded multiplicand data; and sequentially adding the selected data according to each bit to output multiplication data of the multiplier and the multiplicand.

In accordance with still another aspect of the invention to obtain the foregoing object, a record medium readable by a digital processing device including a program of command languages which can be executed by the digital processing device for performing a fixed point multiplying method using an encoded multiplicand, wherein the program is executed in the following steps of: storing binary data of the multiplier into n number of n bit shift registers by shifting each of the binary data by one bit; storing binary encoded multiplicand data; selecting one data from a group including the data stored in the shift registers, inverted data of the stored data and 0 in response to each of the bit-shifted data of the encoded multiplicand data; and sequentially adding the selected data according to each bit to output multiplication data of the multiplier and the multiplicand.

DETAILED DESCRIPTION OF THE PREFERRED EMBODIMENT

Figure 1:
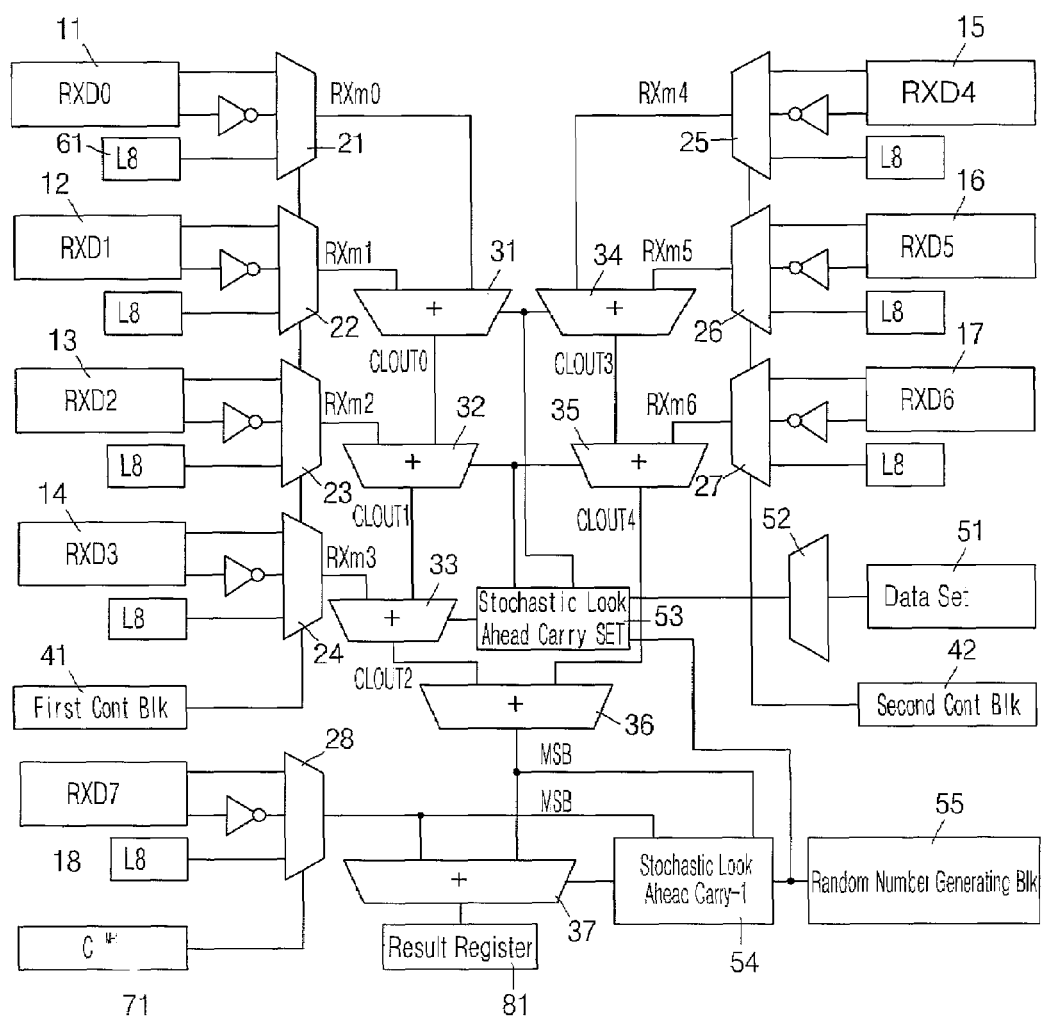
FIG. 1 is a circuit diagram of a fixed point multiplying apparatus using encoded multiplicands in accordance with an embodiment of the invention.

The following detailed description will primarily introduce basic concepts adopted as principles for realizing a fixed point multiplying apparatus using an encoded multiplicand in accordance with the invention.

A general linear transformation algorithm is based upon a vector product operation as in Equation 1:

$$Y = \sum_k w_k x_k. \qquad \text{Equation 1}$$

Herein, a multiplier $x_k$ is expressed into a binary form as in Equation 2:

$$x_k = -\overline{C}_k^j \cdot 2^{M-1} + \sum_{j=0}^{M-2} \overline{C}_k^j \cdot 2^j, \qquad \text{Equation 2}$$

where $$\forall j \in Z[0, M-1] \text{ and } \overline{C}_k^j \in \{0, 1\}.$$

The ranges of the multiplier $x_k$ and a multiplicand $w_k$ in Equation 2 are expressed as in Equation 3:

$$-2^{M-2} \le x_k \le 2^{M-2} \text{ and } 0 \le |w_k| \le 2(1 - 2^{-(M-1)}), \qquad \text{Equation 3}$$

where $\forall M \in Z(0, \infty)$.

Herein, the multiplicand $w_k$ will be expressed into a transformed binary as in Equation 4:

$$w_k = C_k^{M-1} \cdot \left(1 - 2_{n_k}^{-(M-1)}\right) \cdot 2^0 + \sum_{i=0}^{M-2} C_k^i \cdot \left(1 - 2_{n_k^i}\right) \cdot 2^{-(M-1)+i}, \qquad \text{Equation 4}$$

where $$\forall i \in Z[0, M-1], \; C_k^i \in \{0, 1\} \text{ and } n_k^i \in \{0, 1\}.$$

Equation 4 is a binary encoding system in accordance with the invention and discriminated from Equation 2 which indicates a general binary system. Referring to Equation 2, $x_k$ becomes a positive or negative number according to the coefficient $\overline{C}_k$ of the highest order bit.

On the contrary, in the binary system expressed in Equation 4, each bit is a negative number if $n_k^I$ is 1 and a positive number if 0. Such a system is redundant and thus unnecessary in a general number system. However, such a system allows the each bit to have a separate positive or negative number in the hardware realization in accordance with the invention, thereby reducing errors occurring in a multiplication caused by the restricted order.

The binary system in accordance with the invention has a coefficient set expressed into $\{C_k^{M-1}, C_k^{M-2}, \Lambda, C_k^0\}$, in which numbers are expressed with another coefficient set expressed into $\{n_k^{M-1}, n_k^{M-2}, \Lambda, n_k^0\}$ for indicating the positiveness or negativeness of the each bit in addition to a conventional binary system.

Therefore, such a binary system constitutes an independent binary system having two coefficient sets including $\{C_k^{M-1}, C_k^{M-2}, \Lambda, C_k^0\}$ and $\{n_k^{M-1}, n_k^{M-2}, \Lambda, n_k^0\}$ different from the conventional binary system, in which the values of $\{C_k^{M-1}, C_k^{M-2}, \Lambda, C_k^0\}$ vary due to existence of $\{n_k^{M-1}, n_k^{M-2}, \Lambda, n_k^0\}$.

Encoding of $\{n_k^{M-1}, n_k^{M-2}, \Lambda, n_k^0\}$ is required in order to express such binary numbers, and thus the encoding in the independent binary system means that $\{C_k^{M-1}, C_k^{M-2}, \Lambda, C_k^0\}$ and $\{n_k^{M-1}, n_k^{M-2}, \Lambda, n_k^0\}$ are encoded into different values from the conventional binary system.

Now, substituting Equations 2 and 4 into Equation 1 will get Equation 5 as follows:

$$Y = \sum_k [C_k^{M-1} \cdot (1 - 2n_k^{M-1}) \cdot 2^0 + \sum_{i=0}^{M-2} C_k^i \cdot$$
$$(1 - 2n_k^i) \cdot 2^{-(M-1)+i}] \cdot [-\overline{C}_k^{M-1} \cdot 2^{M-1} + \sum_{j=0}^{M-2} \overline{C}_k^j \cdot 2^j] \cdot$$
$$\sum_k [-\overline{C}_k^{M-1} C_k^{M-1} \cdot (1 - 2n_k^{M-1}) \cdot 2^0 +$$
$$C_k^{M-1} \cdot (1 - 2n_k^{M-1}) \cdot \sum_{j=0}^{M-2} \overline{C}_k^j \cdot 2^j -$$
$$\overline{C}_k^{M-1} \sum_{i=0}^{M-2} C_k^i \cdot (1 - 2n_k^i) \cdot 2^{-(M-1)+i} \cdot 2^{M-1} +$$
$$\sum_{i=0}^{M-2} C_k^i \cdot (1 - 2n_k^i) \cdot 2^{-(M-1)+i} \cdot \sum_{j=0}^{M-2} \overline{C}_k^j \cdot 2^j].$$

Equation 5

A positive part in Equation 5 will be defined as in Equation 6:

$$\overline{x}_k = \sum_{j=0}^{M-2} \overline{C}_k^j \cdot 2^j.$$

Equation 6

Also, a part excluding the highest order bit of $w_k$ will be defined as in Equation 7:

$$\overline{w}_k = \sum_{j=0}^{M-2} C_k^j \cdot (1 - 2n_k^i) \cdot 2^{-(M-1)+i}.$$

Equation 7

Finally, $C_k^l \cdot 2^{-(M-1)+1}$ will be defined with a shift operator $S^l$ as in Equation 8

$$S^l = C_k^l \cdot 2^{-(M-1)+1}, \text{ where } l = i - (M-1)$$ Equation 8.

Now, substituting Equations 6 to 8 into Equation 5 will get Equation 9 as follows:

$$Y = \sum_k [-\overline{C}_k^{M-1} C_k^{M-1} (1 - 2n_k^{M-1}) 2^0 +$$
$$C_k^{M-1} (1 - 2n_k^{M-1}) \overline{x}_k - 2^{M-1} \overline{C}_k^{M-1} \overline{w}_k + \sum_{l=1}^{M-1} S^{-l} \overline{x}_k].$$

Equation 9

In a Discrete Cosine Transformations (DCT) or a Fast Fourier Transform (FFT) algorithm, a multiplicand generally has a value smaller than 1 due to base function characteristics of a conversion space, i.e., the first two terms in Equation 9 are 0 because the coefficient is $C_k^{M-1}$. Therefore, Equation 9 is arranged as in Equation 10:

$$Y = \sum_k [\sum_{l=1}^{M-1} S^{-l} \overline{x}_k - 2^{M-1} \overline{C}_k^{M-1} \overline{w}_k].$$

Equation 10

The last term in Equation 10 will be defined as Equation 11:

$$w_k^* = 2^{M-1} \overline{w}_k =$$
$$\sum_{i=0}^{M-2} C_k^i \cdot (1 - 2n_k^i) 2^i = \sum_{i=0}^{M-2} C_k^i \cdot (1 - 2n_k^i) 2^{-(M-1)+i} \cdot 2^{M-1}.$$

Equation 11

Therefore, Equation 11 means that an encoded multiplicand smaller than 1 is integerized. Now, substituting Equation 11 into Equation 10 will get Equation 12 as follows:

$$Y = \sum_k [\sum_{l=1}^{M-1} S^{-l} \overline{x}_k - \overline{C}_k^{M-1} w_k^*].$$

Equation 12

Referring to Equation 12, it can be understood that multiplication of the multiplicand smaller than 1 with the multiplier having an integer value is realized by subtracting the multiplicand, which is integerized when the multiplier is negative, from the sum of the right shifted values of the multiplier.

Referring Equation 12, the term $$\sum_{l=1}^{M-1} S^{-l} \overline{x}_k$$

can be obtained by adding only those values, which are selected via a multiplexer controlled with the shift operator $S^{-1}$, of the bit-shifted values of the multiplier $x_k$. Further, the term $\overline{C}_k^{M-1} w_k^*$ can be obtained as an input of the multiplexer for selecting an integer value or 0 of the multiplicand as the highest order bit of the multiplier.

Describing in more detail, the kth element of Y is expressed as $y_k = x_k \times w_k$ in the operation of Equation 1, supposing that $x_k$ is a multiplier, $w_k$ is a multiplicand, and $|w_k|$ is smaller than 1. It is supposed that $y_k$, $x_k$ and $w_k$ each are expressed with M bits. In this case, $w_k$ is encoded into $w_x$ which is an independent binary system by Equation 4. The encoded $w_x$ is transformed again into a specific form $w_k^*$, which is used in actual multiplication.

In the hardware realization of a multimedia codec, a DCT coefficient is stored into a memory in general,. Therefore, the DCT coefficient is encoded into such a binary system in use. Referring to Equation 7, Equation 11 and Equation 8, it can be understood that the shift operator $S^{-1}$ is expressed with the multiplicand or the encoded multiplicand $w_k$ or $w_k^*$.

Therefore, in the multiplying apparatus in accordance with the invention, it can be understood that $x_k$ excluding the highest order bit of the multiplicand $x_k$ is a major input, and the each bit value of the encoded multiplicand $w_k^*$ is used as a value for controlling the shifting number of the shift registers or a multiplexer signal for selecting the previously shifted value or 0. In other words, if the multiplier $x_k$ is given as the input, the each bit value of the multiplicand $w_k^*$, which is encoded from the multiplicand $w_k$, is obtained as the control signal of a logic circuit so as to simply carry out the fixed point operation.

Therefore, the hardware in accordance with Equation 12 is sufficiently realized with only an adder, a register for storing the shifted values of a multiplier and a multiplexer. An 8 bit multiplying apparatus in accordance with such an embodiment is shown in FIG. 1.

Referring to FIG. 1, the fixed point multiplying apparatus using an encoded multiplicand in accordance with the invention comprises: n number of n bit shift registers 11 to 18 for storing binary data of the multiplier by shifting each of the binary data by one bit; multiplexirs 21 to 28 for receiving one data as an input selected from a group including the data stored in the shift registers 11 to 18, inverted data of the stored data and 0 in response to a control signal for selecting the input; control blocks 41, 42 and 71 for storing multiplicand data which are binary encoded according to equation 1, selecting the shift registers corresponding to bit values of the multiplicand data, and applying the control signal to the corresponding adders; and n−1 number of adders 31 to 37 for sequentially adding output values from the adders 21 to 28 according to each bit to output multiplication data of the multiplier and the multiplicand.

RxDL are n bit registers, in which a character L in RxDL indicates the (n−L) bit shift of the multiplier. For example, when n is 8, RxD5 means an 8 bit register containing a 3 bit code-extended multiplier. L8 61 indicates an n bit '0', RxmL are selected from RxDL,/RxDL and '0' by the value of Lth bit of the multiplicand. The first control block 41 indicates those values of the encoded multiplicand which are used for selecting the left multiplexer or the 0, 1, 2 and $3^{rd}$ bits of the encoded multiplicand in FIG. 1. The second control block 42 indicates those values of the encoded multiplicand which are used for selecting the right multiplexer or the 4, 5 and $6^{th}$ bits of the encoded multiplicand in FIG. 1.

$C_k^{M-1}$ indicates the highest order bit of the encoded multiplicands. CLOUTL are obtained through respective addition of resultant sums from upstream ends with the adders. For example, CLOUT0 indicates the sum of Rxm0 and Rxm1, and CLOUT3 indicates the sum of Rxm4 and Rxm5.

The following will present a multiplication of the multiplier into the multiplicand through the multiplying apparatus configured as set forth above. Supposing that both of the multiplier $x_k$ and the multiplicand $w_k^*$ are 8 bits, the n bit right shifted value of the multiplier $x_k$ is stored into RxDn. For example, if the multiplier $x_k$ is '01010111', '00001010' is stored into RxD3 14. Storage is carried out from RxD0 to RxD7 in such a manner. One of three values such as RxDn, non-RxDn and '00000000', which are applied to each multiplexer according to the two encoded sets $\{C_k^{M-1}, C_k^{M-2}, \Lambda, C_k^0\}$ and $\{n_k^{M-1}, n_k^{M-2}, \Lambda, n_k^0\}$ of the multiplicand $w_k^*$, is applied into the multiplexer. For example, if Ck3 is 1 and nk3 is 1, non-RxD3 14 is applied into the adder 24. If Ck3 is 1 and nk3 is 1, non-RxD3 14 is applied into the multiplexer 24. If Ck3 is 1 and nk3 is 0, the value stored in RxD3 14 is applied into the adder 24. If Ck3 is 0, '00000000' is applied into the multiplexer 24.

Such processes are executed by respectively applying the encoded values of the multiplicand as control values of the multiplexers 21 and 27 with the first and second control blocks 41 and 42. The processes are executed in parallel so that multiplication is performed through the final addition, and a resultant value is stored in a result register 81.

As described previously, the present invention is not restricted to the foregoing embodiment and the accompanying drawing, but it will be apparent to those skilled in the art that various substitutions, variations and modifications can be made without departing from the technical scope of the invention.

With the high-performance fixed point multiplying apparatus using an encoded multiplicand in accordance with the invention as described hereinbefore, a transform algorithm such as the DCT used in a codec for compressing a multimedia image and a still image can be realized with a high performance.

The multiplicand in use for multiplication which is binary encoded in accordance with the invention can constitute a multiplicand table with a much smaller bit number compared to the conventional scheme. The self-memory usage is reduced while the multiplication is executed with a high performance so that encoding and reverse encoding of multimedia images in real time can be effectively carried out.

Further, the invention can be widely applied to various codec algorithms in various forms of loss compression.

What is claimed is:

1. A fixed point multiplying apparatus for performing a multiplication of a multiplier and an encoded multiplicand, the apparatus comprising:

n number of n bit shift registers for storing binary data of the multiplier by shifting each of the binary data by one bit;

multiplexers for selecting and receiving one data as an input from a group consisting of the data stored in the shift registers, inverted data of the stored data, and 0 in response to a control signal for selecting the input;

control blocks for storing multiplicand data which are binary encoded according to equation 1, selecting the shift registers corresponding to bit values of the multiplicand data, and applying the control signal to the corresponding multiplexers; and n−1 number of adders for sequentially adding output values from the multiplexers according to each bit to output multiplication data of the multiplier and the multiplicand:

$$w_k = C_k^{M-1} \cdot (1 - 2n_k^{-(M-1)}) \cdot 2^0 + \sum_{i=0}^{M-2} C_k^i \cdot (1 - 2n_k^i) \cdot 2^{-(M-1)+i},$$

where $\forall i \in Z[0, M-1]$, $C_k^i \in \{0,1\}$ and $n_k^i \in \{0,1\}$, $$Y = \sum_k w_k x_k,$$

where $w_k$ is the multiplier and $x_k$ is the multiplicand, and $$x_k = -\overline{C}_k^j \cdot 2^{M-1} + \sum_{j=0}^{M-2} \overline{C}_k^j \cdot 2^j,$$

where $$\forall j \in Z[0, M-1] \text{ and } \overline{C}_k^j \in \{0, 1\}. \qquad \text{Equation 1}$$

2. The fixed point multiplying apparatus of claim 1, wherein the control blocks comprises:

a first control block for storing bit data of the multiplicand data excluding the highest order bit to apply the control signal for selecting the input to the multiplexers excluding the multiplexer corresponding to the register of the highest order bit of the multiplier; and a second control block for storing the highest order bit data of the multiplicand data to apply the control signal for selecting the input to the multiplexer corresponding to the register of the highest order bit of the multiplier.

3. A fixed point multiplying method for performing a multiplication of a multiplier and a multiplicand by encoding the multiplicand, the method comprising the following steps of:

storing binary data of the multiplier into n number of n bit shift registers by shifting each of the binary data by one bit;

storing multiplicand data which are binary encoded according to Equation 1;

selecting one data from a group including the data stored in the shift registers, inverted data of the stored data and 0 in response to each of the bit-shifted data of the encoded multiplicand data; and sequentially adding the selected data according to each bit to output multiplication data of the multiplier and the multiplicand:

$$w_k = C_k^{M-1} \cdot (1 - 2n_k^{-(M-1)}) \cdot 2^0 + \sum_{i=0}^{M-2} C_k^i \cdot (1 - 2n_k^i) \cdot 2^{-(M-1)+i},$$

where $$\forall i \in Z[0, M-1],\ C_k^i \in \{0, 1\} \text{ and } n_k^i \in \{0, 1\},$$

$$Y = \sum_k w_k x_k,$$

where $w_k$ is the multiplier and $x_k$ is the multiplicand, and $$x_k = -\overline{C}_k^{-i} \cdot 2^{M-1} + \sum_{j=0}^{M-2} \overline{C}_k^{j} \cdot 2^j,$$

where $$\forall j \in Z[0, M-1] \text{ and } \overline{C}_k^{j} \in \{0, 1\}. \quad \text{Equation 1}$$

4. The fixed point multiplying method of claim 3, wherein the step of selecting one data comprises the steps of:

selecting data about the register of the highest order bit of the multiplicand using the bit data of the multiplicand data excluding the highest order bit; and selecting data about the register of the highest order bit of the multiplier data using the highest order bit data.

5. A record medium readable by a digital processing device including a program of command languages which can be executed by the digital processing device for performing a fixed point multiplying method using an encoded multiplicand, wherein the program is executed in the following steps of:

storing binary data of the multiplier into n number of n bit shift registers by shifting each of the binary data by one bit;

storing multiplicand data which are binary encoded according to Equation 1;

selecting one data from a group including the data stored in the shift registers, inverted data of the stored data and 0 in response to each of the bit-shifted data of the encoded multiplicand data; and sequentially adding the selected data according to each bit to output multiplication data of the multiplier and the multiplicand:

$$w_k = C_k^{M-1} \cdot (1 - 2n_k^{-(M-1)}) \cdot 2^0 + \sum_{i=0}^{M-2} C_k^i \cdot (1 - 2n_k^i) \cdot 2^{-M-1+i},$$

where $\forall i \in Z[0, M-1], C_k^i \in \{0,1\}$ and $n_k^i \in \{0,1\}$, $$Y = \sum_k w_k x_k,$$

where $w_k$ is the multiplier and $x_k$ is the multiplicand, and $$x_k = -\overline{C}_k^{-i} \cdot 2^{M-1} + \sum_{j=0}^{M-2} \overline{C}_k^{j} \cdot 2^j,$$

where $$\forall j \in Z[0, M-1] \text{ and } \overline{C}_k^{j} \in \{0,1\}. \quad \text{Equation 1}$$

* * * * *